(12) United States Patent
Rossi, Jr. et al.

(10) Patent No.: US 7,346,846 B2
(45) Date of Patent: Mar. 18, 2008

(54) STRATEGIES FOR PROVIDING JUST-IN-TIME USER ASSISTANCE

(75) Inventors: Robert A. Rossi, Jr., Bellevue, WA (US); Trent M. Swanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 10/857,543

(22) Filed: May 28, 2004

(65) Prior Publication Data

US 2005/0268234 A1    Dec. 1, 2005

(51) Int. Cl.
G06F 3/00 (2006.01)
G06F 3/048 (2006.01)

(52) U.S. Cl. ............... 715/705; 715/810; 715/711; 715/710; 715/715; 715/716

(58) Field of Classification Search ............... 715/810, 715/705, 711, 710, 715, 716
See application file for complete search history.

(56) References Cited

U.S. PATENT DOCUMENTS

| | | | |
|---|---|---|---|
| 5,535,323 | A | 7/1996 | Miller et al. |
| 5,546,521 | A | 8/1996 | Martinez |
| 5,764,229 | A | 6/1998 | Bennett |
| 5,801,692 | A | 9/1998 | Muzio et al. |
| 6,177,945 | B1 | 1/2001 | Pleyer |
| 6,278,993 | B1 * | 8/2001 | Kumar et al. ............... 707/3 |
| 6,300,950 | B1 | 10/2001 | Clark et al. |
| 6,437,800 | B1 * | 8/2002 | Malamud et al. ............ 715/711 |
| 6,453,336 | B1 * | 9/2002 | Beyda et al. ............... 709/204 |
| 6,633,310 | B1 | 10/2003 | Andrew et al. |

(Continued)

FOREIGN PATENT DOCUMENTS

GB    2355088    4/2001

(Continued)

OTHER PUBLICATIONS

Alberto Tempia Bonda, "Usability Evaluation of Transparent User Interface for Small Display Terminals," Performed at NEC Kansai Lab, Sep. 2003, available at: <http://rangiroa.essi.fr/DEA-RSD/2002-03/03-dea-tempia.doc>, pp. 1-62.

(Continued)

*Primary Examiner*—Doug Hutton
*Assistant Examiner*—Soumya Dasgupta
(74) *Attorney, Agent, or Firm*—Lee & Hayes, PLLC

(57) ABSTRACT

Help functionality is described for integrating help information into a primary application in a just-in-time fashion. The help functionality can perform this task by providing a see-through panel which is presented on top of an application interface provided by the primary application. A user can move a mark on the see-through panel to identify features of the application interface concerning which he or she may have questions. The help functionality responds by presenting potentially context-sensitive help information to the user in audio mode and/or visual mode. If the visual mode is selected, the help functionality can present the help information on the see-through panel itself, and/or can dynamically move parts of the application interface to accommodate the display of the help information. The help functionality can supply the help information from a local source and/or a remote source, in an automated manner and/or a manual manner (e.g., using a remote human assistant).

24 Claims, 7 Drawing Sheets

U.S. PATENT DOCUMENTS

| | | | |
|---|---|---|---|
| 2001/0017622 A1 | 8/2001 | Patel et al. | |
| 2002/0154153 A1 | 10/2002 | Messinger et al. | |
| 2003/0142109 A1* | 7/2003 | Brown et al. | 345/592 |
| 2004/0090467 A1 | 5/2004 | Bonura et al. | |

FOREIGN PATENT DOCUMENTS

| | | |
|---|---|---|
| WO | WO0068769 | 11/2000 |

OTHER PUBLICATIONS

Susan M. Harrison, "A Comparison of Still, Animated, or Nonillustrated On-Line Help with Written or Spoken Instructions in a Graphical User Interface," Conference on Human Factors in Computing Systems, Denver, Colorado, United States, Proceedings of the SIGCHI conference on Human Factors in Computing Systems, 1995, pp. 82-89.

Jennifer Lai, When Computers Speak, Hear, and Understand, Communications of the ACM, vol. 44, No. 3, Mar. 2001, pp. 66-67.

Aaron Marcus and Eugene Chen, "Designing the PDA of the Future," Interactions, vol. 9, Issue 1, Jan. 2002, pp. 34-44.

Robert Prince, Jianwen Su, Hong Tang, and Yonggang Zhao, "The Design of an Interactive Online Help Desk in the Alexandria Digital Library," Proceedings of the International Joint Conference on Work Activities Coordination and Collaboration, San Francisco, California, United States, Feb. 1999, published by ACM, 1999, pp. 217-226.

Nitin Sawhney and Chris Schmandt, "Nomadic Radio: Speech and Audio Interaction for Contextual Messaging in Nomadic Environments," ACM Transactions on Computer-Human Interaction, vol. 7, No. 3, Sep. 2002, pp. 353-383.

Barry Arons, "Hyperspeech: Navigating in Speech-Only Hypermedia," Hypertext '91 Proceedings, Dec. 1991, pp. 133-146.

Eric A. Bier, Maureen C. Stone, Ken Fishkin, William Buxton, and Thomas Baudel, "A Taxonomy of See-Through Tools," Conference on Human Factors in Computing Systems, Boston, Massachusetts, United States, Proceedings of the SIGCHI Conference on Human Factors in Computing Systems, 1994, pp. 358-364.

Arlene F. Aucella and Susan F. Ehrlich, "Voice Messaging: Enhancing the User Interface Based on Field Performance," Conference on Human Factors in Computing Systems, Boston, Massachusetts, United States, Proceedings of the SIGCHI Conference on Human Factors in Computing Systems, 1986, pp. 156-161.

Joanna Lumsden and Stephen Brewster,"A Paradigm Shift: Alternative Interaction Techniques for Use with Mobile & Wearable Devices," IBM Centre for Advanced Studies Conference, Toronto, Ontario, Canada, Proceedings of the 2003 Conference of the Centre for Advanced Studies Conference on Collaborative Research, 2003, pp. 197-210.

Debby Hindus, Barry Arons, Lisa Strifelman, Bill Gaver, Elizabeth Mynatt, and Maribeth Back, "Designing Auditory Interactions for PDAs," Symposium on User Interface Software and Technology, Pittsburgh, Pennsylvania, United States, Proceedings of the 8th annual ACM Symposium on User interface and Software Technology, 1995, pp. 143-146.

M. Christensen, S. Chaudhary, R. Gottshall, J. Hartman, and D. Yatcilla, "EASE: A User Interface for the Elderly," Proceedings of the Third International Conference on Human-Computer Interactions, Sep. 18, 1999, pp. 428-435.

Vadim Gorokhovsky and Lou Amadio, "Layered Windows: A New Way to Use Translucency and Transparency Effects in Windows Applications," Microsoft Library, Jan. 2000, accessible at: <http://msdn.microsoft.com/library/default.asp?url=/library/en-us/dnwui/html/layerwin.asp>, 7 pages.

Beverly L. Harrison, Gordon Kurtenbach, and Kim J. Vincente, "An Experimental Evaluation of Transparent User Interface Tools and Information Content," Symposium on User Interface Software and Technology, Pittsburgh, Pennsylvania, United States, Proceedings of the 8th Annual ACM Symposium on User Interface and Software Technology, pp. 81-90.

Tomonari Kamba, Shawn A. Elson, Terry Harpold, Tim Stamper, and Piyawadee "Noi" Sukaviriya, "Using Small Screen Space More Efficiently," Conference on Human Factors in Computing Systems, Vancouver, British Columbia, Canada, Proceedings of the SIGCHI Conference on Human Factors in Computing Systems, 1996, pp. 383-390.

Linux Online homepage, available at: <http://www.linux.org,>, accessed on May 27, 2004, 2 pages.

PalmSource homepage, available at: <http://www.palmsource.com/>, accessed on May 27, 2004, 1 page.

PalmOne homepage, available at: <http://www.palmone.com/us/?siteRef=pI-xfer>, accessed on May 27, 2004, 2 pages.

Symbian homepage, available at: <http://www.symbian.com/>, accessed on May 27, 2004, 1 page.

European Search Report for Application No. EP 05104376, dated Dec. 29, 2006, 4 pages.

* cited by examiner

STRATEGIES FOR PROVIDING JUST-IN-TIME USER ASSISTANCE

TECHNICAL FIELD

This subject matter relates to strategies for providing information to users to assist the users in interacting with computer devices.

BACKGROUND

Software developers commonly incorporate "help" functionality into their products. This help functionality provides help information to users to assist the users in interacting with the products. Numerous techniques exist for providing such help information to users. In one technique, the help functionality allows a user to input a search term pertaining to a topic of interest. For example, in the context of a text editing software application, the user may wish to determine how to format a cell of a table. The help functionality allows the user to input a search term pertaining to this text editing task. According to another technique, the help functionality may provide a demonstration pertaining to a general topic, such as by providing a simulation of possible user input actions and the resultant behavior of the software product. Typical demonstrations use a slideshow-based format, a video-based format, an animated format, and so on. The user typically reviews this demonstration prior to interacting with the software product. In any case, in traditional desktop environments, the help functionality typically displays help information in the form of one or more panel-type displays (e.g., such as a window-type display provided by Windows™ operating system produced by Microsoft Corporation of Redmond, Wash.). The help functionality commonly presents these panel-type displays on top of, or adjacent to, the primary application workspace with which the user is currently interacting.

The above help functionality is not fully satisfactory in many circumstances. Generally, the software products do not satisfactorily integrate their help functionality into the primary application, requiring the user to repeatedly toggle between the help functionality and the primary application. This interaction can be distracting, as it takes the user's attention off of a task at hand to interact with the separate help functionality. Further, upon activating the help functionality, the user may have to make elaborate and burdensome actions to find a piece of help information which is relevant to the user's task at hand. Further, because of this lack of meaningful integration, the user may have difficulty in applying the knowledge imparted by the help functionality to the task at hand.

Moreover, many computer devices employ relatively small display surfaces. For example, mobile telephones, personal digital assistants (PDAs), and various laptop computers all have smaller display surfaces compared to traditional computer workstation display devices. These smaller display surfaces often do not have the display surface "real estate" to present help information in the manner described above, that is, by providing separate help panel-type displays.

According, there is an exemplary need to provide more effective techniques for delivering help information to users.

SUMMARY

According to one exemplary implementation, a method is described for presenting help information to a user. The method comprises: (a) providing an application interface generated by a primary application, wherein the application interface includes at least one user interface feature associated therewith; (b) providing a help selection mechanism that overlays the application interface, which allows the user to request help information regarding the above-identified at least one user interface feature; (c) receiving a help request from the user via the help selection mechanism; and (d) presenting the help information to the user, in response to the received help request, in a manner which allows the user to continue interacting with the primary application.

According to another exemplary feature, the method is performed using at least one of: a mobile telephone device; a personal digital assistant device; a laptop computer device; a tablet-type input device, or a wearable computer device.

According to another exemplary feature, the method is performed using a computer workstation.

According to another exemplary feature, the above-identified providing of the help selection mechanism comprises providing a see-through panel which overlays the application interface.

According to another exemplary feature, the above-identified receiving of the help request from the user comprises receiving information indicating that the user has positioned a marker on the help selection mechanism in proximity to the above-identified at least one user interface feature.

According to another exemplary feature, the above-identified receiving of the help request from the user comprises receiving information indicating that the user has created a mark on the help selection mechanism in proximity to said at least one user interface feature using a marking mechanism.

According to another exemplary feature, the method further comprises, in response to the receipt of the user's help request, determining what help information to present to the user, wherein the determining of what help information to present to the user comprises manually determining, by a human assistant, the help information to deliver to the user based on the user's help request.

According to another exemplary feature, the above-identified presenting of the help information to the user comprises presenting audio help information to the user.

According to another exemplary feature, the above-identified presenting of the help information to the user comprises presenting visual help information to the user.

According to another exemplary feature, the above-identified presenting of the visual help information to the user comprises presenting the help information on the help selection mechanism.

According to another exemplary feature, the above-identified presenting of the help information to the user comprises delivering the help information from a source which is local with respect to a computer device on which the user performs the method.

According to another exemplary feature, the above-identified presenting of the help information to the user comprises delivering the help information from a source which is remote with respect to a computer device on which the user performs the method.

Related apparatuses, machine readable media, and systems are also described.

Additional implementations and features will be described in the following.

Figure 1:
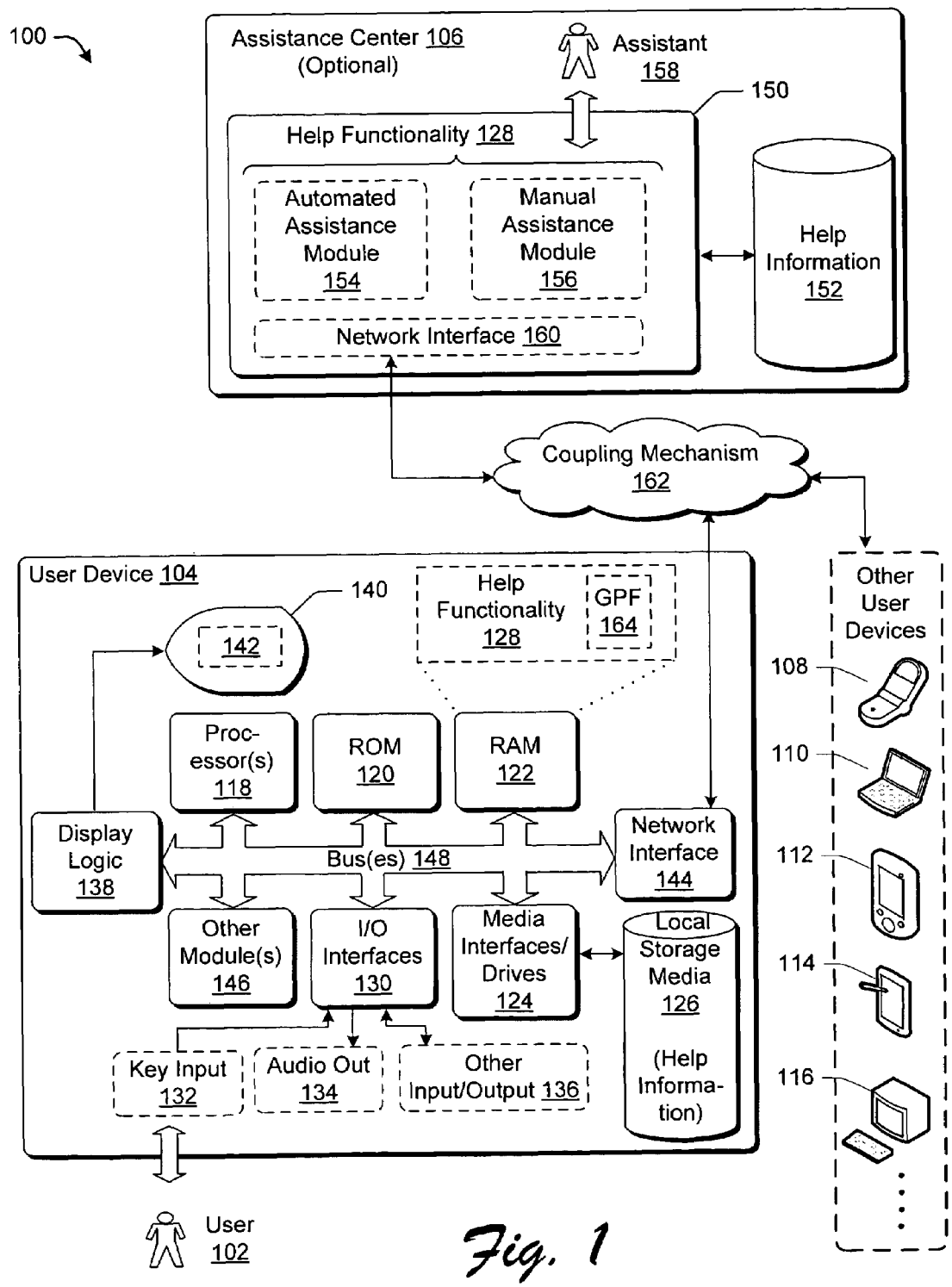
FIG. 1 shows an exemplary system for providing help information to a user who is interacting with a primary application.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Help functionality is described herein for providing help information in a manner that is not overly disruptive to a user's interaction with a primary application. The help functionality achieves this result through various features. According to one feature, the help functionality provides help information that is fully integrated with the primary application itself. This allows the help functionality to parse out and deliver the help information to the user at appropriate junctures in the user's interaction with the primary application. In other words, the help functionality provides relevant help information to the user just as the user requires such information, hence providing so-called "just-in-time" help information. This approach departs from conventional applications which require the user to view general tutorials before engaging in an application task, or to take burdensome steps by interacting with a general purpose search engine to investigate a feature of interest.

According to another feature, the help information is presented in a manner that does not overly divert the user's attention from the primary application. That is, the help functionality provides various techniques for seamlessly layering the help information "on top" of the primary application. One technique for implementing this feature is to provide audio help information that is relevant to the application task that the user is currently engaged in. Another technique for implementing this feature is to provide a see-through panel that is overlaid on top of the primary application, wherein help information can be requested via the see-through panel and then presented on the see-through panel. Another technique for implementing this feature is to insert the help information between display fields that are provided in the application interface provided by the primary application, thereby, in a sense, pushing these fields momentarily apart to make room for the help information. In any of the above cases, the help functionality can provide the help information from a central assistance center, or can provide the help information from a source that is local to the computer device (e.g., from a local storage) (or from both central and local sources).

Still other features and attendant benefits will be described in the following discussion.

The help functionality can be implemented using software, and/or firmware (e.g., fixed logic circuitry). The term "functionality," "logic" or "module" as used herein generally represents software, firmware, or a combination of software and firmware. For instance, in the case of a software implementation, the term "functionality," "logic" or "module" represents program code that performs specified tasks when executed on a processing device or devices (e.g., CPU or CPUs). The program code can be stored in one or more computer readable memory devices. The illustrated separation of functionality, logic and modules into distinct units may reflect an actual physical grouping and allocation of such software and/or hardware, or can correspond to a conceptual allocation of different tasks performed by a single software program and/or hardware unit. The illustrated functionality, logic and modules can be located at a single site (e.g., as implemented by a single processing device), or can be distributed over plural locations.

The term "help information" refers to any type of information designed to assist a user in performing a task on a computer device. It can comprise textual information, pictorial/graphical information, symbolic information, audio information, tactile information, and so on, as well as various combinations of such forms of information.

The term "primary application" as used herein refers to any software or hardware functionality to which the help information pertains. For instance, the primary application can pertain to functionality provided by an operating system of any kind. Alternatively, the primary application can pertain to a user application of any kind that operates using the services of an underlying operating system. Still alternatively, the primary application can refer to any kind of mechanical or electrical apparatus that provides help functionality integrated therewith to help users in interacting with the apparatus. In any case, the user interface presentation that the primary application uses to interface with the user is referred to as an "application interface."

In the computing environment, the help functionality can be used to provide help information that assists users in interacting with any kind of computer device that implements any kind of primary application. Because of its ability to provide assistance in a non-obtrusive manner, the help functionality is particularly advantageous when applied to computer devices having small display surfaces, such as mobile telephones, various kinds of wearable computing devices, personal digital assistant (PDA) devices, tablet-type portable devices, laptop computers, and so on. However, the help functionality can also be applied to traditional computing environments, such as traditional workstation computing environments.

This disclosure includes the following sections. Section A describes an exemplary system for implementing the help functionality. Section B describes an exemplary method for interacting with the system of Section A.

A. Exemplary System

A.1. System Overview

FIG. 1 shows an exemplary system 100 for providing help information to a user 102, or, more generally, to multiple users (not shown). The help information is delivered to the user 102 via a user device 104. In one mode, the help information can originate from the local storage of the user device 104. In another mode, the help information can originate from a remote assistance center 106. Each of the above principal components of the system 100 (that is, the user device 104 and the assistance center 106) will be explained below.

The user device 104 can comprise any type of computing device for executing any kind of primary application. Particular types of computing devices include any kind of portable/mobile device (such as a mobile telephone, a PDA, a tablet-type input device, a wearable computer, etc.), any kind of kind of laptop computer device, any kind of application-specific device (e.g., a game console), any kind of stationary general purpose computer device (e.g., a computer workstation), and so on. To illustrate this versatility, FIG. 1 shows that the system 100 can interact with other user devices, including exemplary mobile telephone 108, exemplary laptop computer 110, exemplary PDA 112, exemplary tablet-type input device 114, and exemplary computer workstation 116, among other kinds of user devices.

The exemplary user device 104 can include one or more processors 118, a ROM memory 120 and a RAM memory 122 for storing computer readable instructions and other data, and a media interface and associated media drives 124 for interacting with various local storage media 126 (such as various magnetic media, optical media, solid state media, and so on). In one implementation, the RAM memory 122 can receive machine readable instructions that define the functions of the primary application, such as an operating system and various user applications of any variety that run on top of the operating system. The RAM memory 122 can also receive machine readable instructions that define the operation of help functionality 128. The primary application and help functionality 128 are provided to the user 102 when the processor 118 executes the instructions stored in the RAM 122. However, one or more operations performed by the primary application and/or the help functionality 128 can also be implemented, in whole or in part, by non-programmable (e.g., hardwired) logic circuitry. Further, one or more operations performed by the primary application and/or the help functionality 128 can be allocated to another processing device, such as the remote assistance center 106 (to be described below). (Geometry processing functionality, i.e., GPF 164, implemented by the help functionality 164, is described in section A.2.iii below).

The user device 104 can also include an input/output interface 130 for receiving input from one or more input devices and for providing output to one or more output devices. Such input devices can include any kind of key input device 132, such as a conventional keyboard or a keypad, etc. The output devices can include any kind of audio output device 134, such as any kind of speaker device. The audio output device 134 can be used to present spoken help information to the user 102. These input and output devices are exemplary and non-limiting; FIG. 1 shows that the system 100 can include a variety of other input and output devices 136, including various kinds of joysticks, trackballs, data gloves, and so on.

Figure 2:
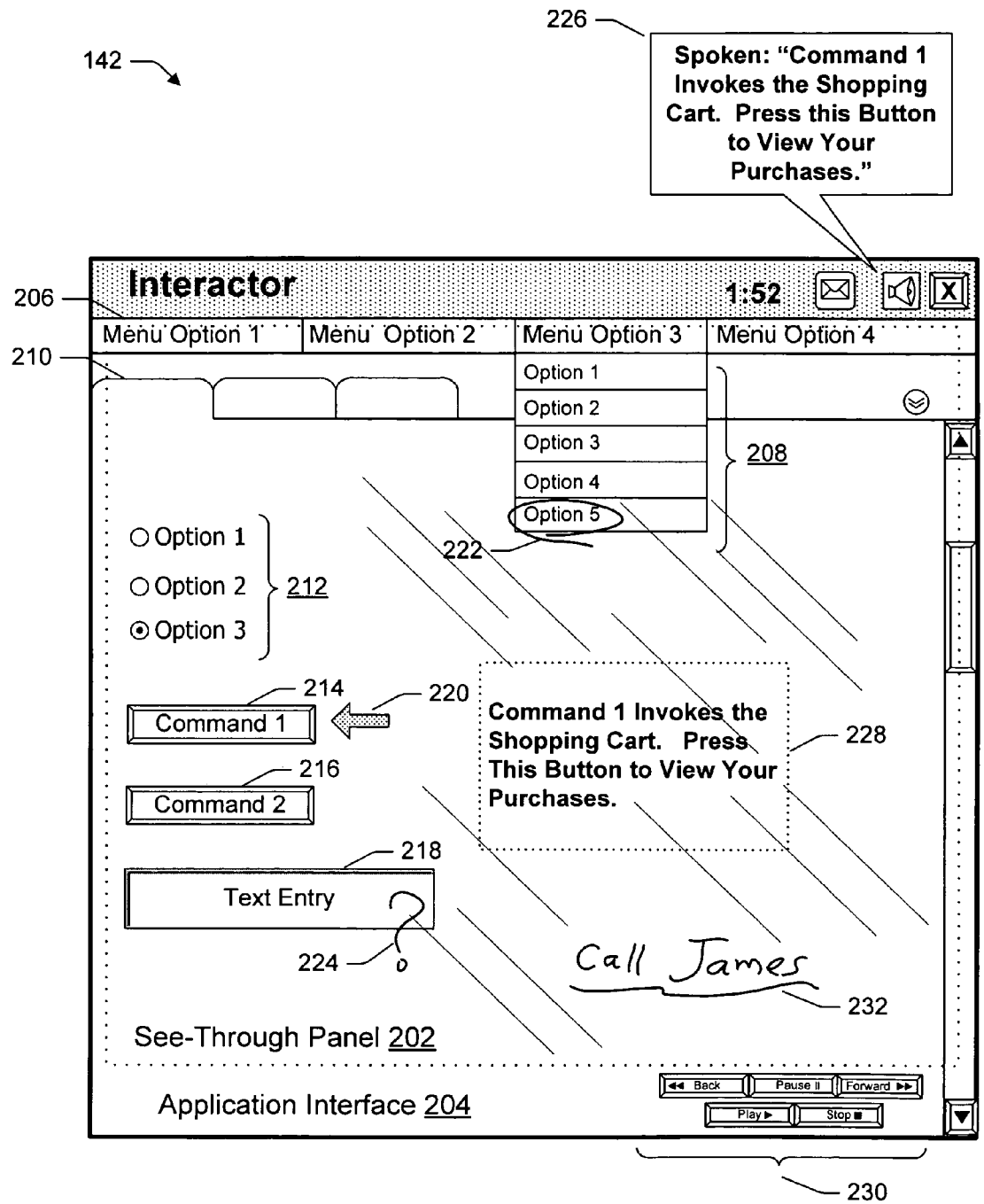
FIG. 2 shows an exemplary user interface presentation for providing help information to the user using the system of FIG. 1.

The user device 104 can also include display logic 138 for presenting visual information to the user 102 via the display device 140. The display device 140 can include any type of device for displaying information associated with the primary application and the help functionality 128. In one case, the display device 140 can be integrated into the housing of the user device 104 itself, such as in the case of the exemplary mobile telephone 108, exemplary PDA 112, exemplary tablet-type device 114, and so on. In other cases, the display device 140 can comprise a separate display monitor, television, etc., such as in the case of the exemplary workstation 116. In any case, the user device 104 can present a graphical user interface presentation 142 on the display device 140. Such graphical user interface presentation 142 can present an application interface provided by the primary application and help information provided by the help functionality 128. FIG. 2, to be described below, illustrates one exemplary graphical user interface presentation 142 that can be presented by the user device 104. Alternatively, the display device 140 can provide non-graphical presentations, such as text information.

The user device 104 can also include a network interface 144 for interacting with any kind of external entity. The network interface 144 can comprise any kind of coupling device, such as a broadband coupling device, a DSL coupling device, a modem-type coupling device, a point-to-point coupling device, and so forth.

The above-described components of the user device 104 are exemplary and non-limiting. As indicated by the generically labeled "other modules" feature 146, the user device 104 can include a variety of other modules. The user device 104 can also omit one or more of the modules shown in FIG. 1. In any case, one or more buses 148 couple all of the above-described components together.

The user device 104 can provide help information in a stand-alone mode. In this mode, the help functionality 128 provided by the user device 104 can furnish help information stored locally in the local storage media 126. In this case, the user device 104 need not communicate with any external entity to perform its functions.

In another implementation, however, the user device 104 can provide help information through cooperative engagement With the remote assistance center 106. The assistance center 106 can represent any kind of head-end infrastructure for interacting with the multiple user devices (e.g., devices 104, 108, 110, 112, 114, 116, . . . ). FIG. 1 generally illustrates any such infrastructure as "processing functionality" 150. In one case, the processing functionality 150 can employ one or more processing devices, such as one or more computer servers coupled together in a server farm. Although not shown, each server can include the same kind of components as the user device 104, such as one or more processing devices (e.g., CPUs), ROM, RAM, media interfaces and associated drives, various input and output devices, a network interface, and so on. Each server can also include software that allows it to perform its ascribed server-related tasks.

The processing functionality 150 can couple to one or more databases 152 (referred to in the singular, below, for convenience). The database 152 can be implemented using any kind of magnetic media, optical media, solid state media, or any other kind of media. Further, the assistance center 106 can employ any kind of database technology for managing the database 152. The database 152 can be used to store help information for dissemination to the user device 104, instead of, or supplemental to, the help information provided by local storage media 126.

The processing functionality 150 can be located at a single site. Alternatively, the processing functionality 150 can be distributed over multiple sites. Likewise, the database 152 can also be stored at a single site or distributed over multiple sites.

The processing functionality 150 of the assistance center 106 can provide an automated assistance module 154 for automatically providing help information to the user 102. For instance, the automated assistance module 154 can automatically supply help information to the user 102 upon the express request of the user 102, or as a result of the user 102's interaction with the primary application. Alternatively, or in addition, the processing functionality 150 can provide a manual assistance module 156 through which a human assistant 158 (or multiple human assistants) can provide help information to the user 102. Such functionality (154, 156) can include any kind of software and hardware for performing the above-identified ascribed tasks, such as one or more computer devices appropriately configured to perform these tasks. FIG. 1 collectively labels the automated assistance module 154 and the manual assistance module 156 as help functionality 128, since these modules (154, 156), in addition to the local help functionality 128 provided by the user device 104, serve the role of providing help information to the user 102.

The processing functionality 150 further includes interface functionality 160 for interacting with the user device 104 (and other user devices) via a coupling mechanism 162. The coupling mechanism 162 can include any kind of network, such as a TCP/IP network (such as the Internet or an intranet), any kind of wireless network, a LAN network, an Ethernet network, and so on (or any combination of these networks). In the case of an Internet implementation, the coupling mechanism 162 can include various hardwired and/or wireless links, various routers, various gateways, various name servers, and so on (not shown). Alternatively, the coupling mechanism 162 can represent a point-to-point coupling between the assistance center 106 and the user device 104.

In summary, the term "help functionality" 128 can refer to any combination of services provided by the local help functionality 128 (provided by the user device 104) and/or the remote help functionality 128 (including the automated assistance module 154 and/or the manual assistance module 156). The particular help functionality 128 that is invoked can depend on the manner in which a developer chooses to implement the operations to be described below. Alternatively, the system 100 can operate in several different help modes (e.g., local and remote help modes), and the user 102 can select one of these modes.

A.2. Help Functionality

The help functionality 128 can determine the particular application tasks that the user 102 is currently engaged in, and then present, in a non-obtrusive manner, help information that is specifically tailored to these tasks. This feature enables the above-mentioned just-in-time delivery of help information because appropriate pieces of help information are automatically presented just when the user 102 needs this information, without unduly interfering with the user 102's interaction with the primary application. With reference to FIGS. 2-5, two aspects of the just-in-time help functionality 128 will be discussed below: a first aspect pertains to the manner in which the help functionality 128 determines what help information to present to the user 102 at different junctures in the user 102's interaction with the primary application; a second aspect pertains to the manner in which the help functionality 128 presents the thus-determined help information to the user 102.

A.2.i. Identifying Relevant Help Information

As to the first aspect, the help functionality 128 can use different techniques to determine what help information to present to the user 102. FIG. 2 shows one such technique that employs a user interface presentation 142 composed of a see-through panel 202 presented on top of an application interface 204.

The application interface 204 refers to any user interface presentation provided by the primary application. In other words, the application interface 204 refers to a normal sequence of pages provided by a primary application to deliver its services to the user 102. For the purpose of the discussion, assume that the application interface 204 pertains to an exemplary application that allows the user 102 to order merchandise or services. The application interface 204 can include any assortment of user interface features. FIG. 2 shows one page of the application interface 204 that includes a series of drop-down menus 206. One drop down menu 208 is expanded to show its exemplary contents. The application interface 204 can also include a plurality of tabbed folders 210, a plurality of so-called radio buttons 212, a plurality of command buttons (214, 216), one or more text entry fields 218, and so forth. The selection and positional arrangement of these user interface features (206-218) shown in FIG. 2 is merely illustrative.

The see-through panel 202 is positioned over the application interface 204. The see-through panel 202 has the property that the user 102 can see through it to view information presented on the application interface 204. The see-through panel 202 can have the appearance of an entirely transparent panel (e.g., as in a clear window), or can have the appearance of a translucent panel (e.g., as some kind of window that reveals the contents of the underlying application interface 204, but modifies it in some way). In any event, the see-through panel 202 preferably includes some visual attribute that allows the user 102 to distinguish it from the underlying application interface 204. In one case, the see-through panel 202 can be made to resemble a glass pane, having, for instance, simulated glass streaks on its surface. In addition, or alternatively, the see-through panel 202 can have a colored tint (e.g., a gray tint) that allows it to be distinguished from the underlying application interface 204. In addition, or alternatively, the see-through panel 202 can have shadowing effects to simulate the positioning of a physical see-through pane slightly above the application interface 204. Still further visual effects can be used to create the impression of a see-through overlay positioned over the application interface 204. In one case, the see-through panel 202 can be conceptualized and implemented as a window-type panel having a see-through property, positioned over, and encompassing, one or more window-type panels constituting the application interface 204. Further information regarding exemplary mechanisms that can be used to implement the see-through panel 202 is presented in Section A.2.iii below.

In one implementation, the primary application presents information on the application interface 204 and the help functionality 128 presents information on the see-through panel 202. In FIG. 2, for instance, the help functionality 128 presents a movable pointer 220 on the see-through panel 202. The user 102 can move the pointer 220 to point to any user interface feature in the application interface 204 concerning which the user 102 would like help information. For example, assume that the user 102 has a question regarding the function performed by the command button 214. To determine this function, the user 102 can position the pointer 220 on the see-through panel 202 such that it points to (or is in a predetermined proximity to) command button 214 on the underlying application interface 214. The user 102 can move the pointer 220 using any kind of input device, such as a keyboard input device, a joystick input device, a trackball input device, a mouse-type input device, and so on.

In response to the user 102's positioning of the pointer 220 in the manner described above, the help functionality 128 can determine the feature of the application interface 204 concerning which the user 102 is interested. This can be performed in various ways. In one case, the help functionality 128 can determine whether the pointer 220 is in a certain X-Y proximity to an underlying feature in the application interface 204. Information regarding what is being displayed on the application interface 102 can be assessed in various ways, such as by extracting information from the code used to display the application interface 204, or by querying an accessibility interface which provides information regarding the features that are currently being presented on the application interface 204, and so forth. Upon determining the feature of the application interface 204 that the user 102 has targeted, the help functionality 128 then provides help information associated with the feature (in the manner to be described below).

The help functionality 128 can rely on other marking techniques to designate features in the application interface 204. For instance, the help functionality 128 can allow the user 102 to manually mark features which he or she is interested in using a stylus. These marks can be added on the see-through panel 202 to designate underlying user interface features. For instance, FIG. 2 shows that the user 102 has drawn a circle 222 around a menu item in the menu list 208 using the stylus, and placed a question mark 224 next to the text entry box 218. The help functionality 128 can include automated text/shape recognition functionality for detecting these telltale inquiry shapes that are drawn on the see-through panel 202, and respond accordingly.

Still other techniques can be used that allow the user 102 to point to different features in the application interface 204. For instance, in an alternative implementation, the help functionality 128 can allow the user 102 to move a pointer (or other mark) within the application interface 204 itself (that is, without the provision of the see-through panel 202). In still another case, the help functionality 128 can allow the user 102 to successively highlight different application interface features, e.g., by navigating over the application interface 204 in response to the activation of an input device. In response, the help functionality 128 can be configured to provide help information pertaining to any application interface feature that is currently highlighted. The help functionality 128 can provide yet additional techniques that allow the user 102 to point to features in the application interface 204.

In all of the above implementations, the user 102 is permitted to point to a feature of the application interface 204 using some selection mechanism to receive help information regarding this feature, while, at the same time, interact with the underlying application interface 204 in the normal manner. For instance, in the case of FIG. 2, the user 102 can move the pointer 220 on the see-through panel 202 using an input device and also activate the underlying command button 214 in the underlying application interface 204, also using the input device. The help functionality 128 can enable this dual control functionality in different ways. According to one technique, the help functionality 128 can allow the user 102 to designate the part of the user interface presentation 142 that the user 102 wishes to manipulate. In other words, the help functionality 128 can allow the user 102 to designate whether the focus of their input action concerns the see-through panel 202 or the underlying application interface 204. This can be implemented by providing a focus control mechanism (such as a toggle switch) that allows the user 102 to designate whether they are interesting in controlling the see-through panel 202 or the underlying application interface 204. The user interface presentation 142 can be configured to respond to this selection by presenting some kind of visual attribute which reflects what part of the user interface presentation 142 that the user 102 is currently focused on (such as by displaying that part in a highlighted state that indicates that it has been selected).

Upon selection of the see-through panel 202 or the underlying application interface 204, subsequent input activity will be directed to and will affect the selected part (that is, either the see-through panel 202 or the underlying application interface 204). In an alternative implementation, the help functionality 128 can provide two separate input control mechanisms, a first input control mechanism that solely controls the pointer 220 of the see-through panel 202 and a second control mechanism that controls the features of the underlying application interface 204. Alternatively, or in addition, information can be added to the visual fields themselves to indicate whether user action that targets those fields should affect the overlying see-through panel 202 or the underlying application interface 204. For instance, the see-through panel 202 can be assigned a display property such that any user input action (such as a mouse click) that is directed to the user interface presentation 142 will "punch through" the see-through panel 202 and control the underling application interface 204, unless that action is specifically targeted to the pointer 220.

The help functionality 128 can provide yet further techniques for determining what feature of the application interface 204 that the user 102 may be interested in. In one alternative technique, the help functionality 128 may not require the user 102 to expressly point to a feature in the application interface 204. Rather, in this technique, the help functionality 128 can infer that the user 102 is interested in a particular topic based solely on the user 102's prior input actions in interacting with the primary application. For instance, the user 102 may be interacting with the primary application in a manner which is suggestive that the user 102 is confused or is inexperienced. For example, the user 102 may have made a series of input actions that define an input pattern that is indicative of the fact that the user 102 requires help, such as the repeated input of incorrect information, or the failure to input any information within an expected period of time. In another example, the user 102 may have made a series of input actions which collectively suggest that the user 102 is in the process of performing a specific type of transaction, such as the on-line purchase of a particular item (where the user 102 may or may not have made a mistake in performing this operation). Based on this analysis, the help functionality 128 can retrieve a help message that focuses on an aspect of the application interface 204 concerning which the user 102 is concurrently interacting with, or will soon be interacting with. This provision provides just-in-time assistance to the user 102 based on an intelligent assessment of the aspects of the application interface 204 that the user 102 is currently having difficulty with, or may soon be having difficulty with. In another implementation, this ability to automatically infer help topics can be combined with the above-described express pointing provision. In this implementation, the help functionality 128 can provide help information corresponding to the application interface feature that the user 102 is currently pointing to, as well as any contextual analysis that the help functionality 128 performs based on the user 102's prior actions.

Upon determining the feature of the application interface 204 that the user 102 has targeted, the help functionality 128 then retrieves help information associated with the targeted feature. There are different ways that this can be performed. In one case, the help functionality 128 can use the identified feature as an index to retrieve pre-stored help information corresponding to the identified feature. This mapping operation can be implemented as part of the primary application or can be implemented as functionality that is separate from the primary application. In one case, different parts of the primary application can include Extensible Markup Language (XML) information which identifies help information that is appropriate to such respective parts. If the user 102 identifies a certain part of the application interface 204, the XML information associated with this part can be accessed, which, in turn, can be used as a pointer or an index to retrieve corresponding help information.

Still other strategies can be used to correlate parts of the primary application with corresponding pieces of help information. For instance, as indicated above, the help functionality 128 can also determine what help information to retrieve based on contextual analysis, such as a consideration of the prior pattern of input actions made by the user 102. More specifically, the help functionality 128 can capture and store information pertaining to a series of the user 102's input actions. This information defines a pattern that may convey the fact that the user 102 is having difficulty with the user interface 204 or is in the course of performing a multi-step transaction. The help functionality 128 can retrieve help information appropriate to an input pattern by comparing the input pattern with a pre-stored database of such patterns, and, upon a match, retrieving help information associated with the matching pattern. Or the help functionality 128 can perform this operation by examining a pattern for key tall-tale actions in the pattern, and retrieving help information associated with these key actions.

Various mechanisms can be used to perform the above-described operations, such as any kind of pattern matching functionality, artificial intelligence functionality, constraint processing functionality, and so on. In any of these cases, the mechanisms can incorporate learning functionality that can perform analysis on the user 102's input actions over an extended period of time to determine prevalent types of input patterns reflected in these actions, prevalent types of errors committed by the user 102 in performing these actions, prevalent types of help information which has proved successful when the user 102 has had difficulties using an aspect of the application interface 204, and so on. The help functionality 128 can apply this analysis to more accurately assess the help-related needs of the user 102 and to provide relevant information to the user 102. The help functionality 128 can also base its learning on a collective analysis of the actions of multiple users. In still other implementations, the help functionality 128 can provide stateless assessments of the user 102's help-related needs, where a certain action by the user 102 always triggers the display of the same type of help information regardless of the context of the user 102's current interaction with the application interface 204.

In any of the above-described cases, the logic implementing the help functionality 128 can be provided primarily at the local site (e.g., by the user device 104), or primarily at the remote site (e.g., by the assistance center 106), or by a combination of logic provided at both the local site and remote site. Likewise, the help information itself can be stored primarily at the local site (e.g., by the user device 104), or primarily at the remote site (e.g., by the assistance center 106), or by a combination of storage provided at both the local site and remote site.

The above examples emphasize the automatic retrieval of help information upon the user 102's identification of features in the application interface 204. However, in yet another implementation, in a remote mode, the help functionality 128 can rely on the human assistant 158 to assess the help-related needs of the user 102. For example, in one case, the manual assistance module 156 can include functionality that allows the human assistant 158 to monitor the actions of the user 102 in interacting with the primary application. For instance, the help functionality 128 can provide a mechanism which allows the human assistant 158 to view a duplicate of the application interface 204 that is being presented to the user 102. Then, based on the assistant 158's own personal experience and judgment, the assistant 158 can decide what help information should be delivered to the user 102. Although not shown, the user device 104 can include a voice communication mechanism (e.g., a microphone for receiving voice signals from the user 102). This would allow the user 102 to directly explain his or her problem to the assistant 158. (Or, in another implementation, the automated assistance module 154 can receive the user 102's voice input, and, using speech recognition technology, determine the user 102's question.)

A.2.ii. Providing the Determined Help Information

The second aspect of the just-in-time delivery pertains to the unique manner in which the thus-determined help information is presented to the user 102. The help functionality 128 can deliver such information in many different ways. By way of overview, the help functionality 128 can deliver the help information as audio information, as visual information (e.g., textual and/or graphical information), or as a combination of audio information and visual information. The help functionality 128 can supply the help information primarily from the local storage media 126, the remote database 152, or a combination of the local storage media 126 and the remote database 152.

The case of audio information delivery will be considered first with reference to FIG. 2. Presume that command button 214 invokes a shopping cart screen. Thus, upon positioning the pointer 220 on the see-through panel 202 in proximity to the command button 214, the help functionality 128 will present the exemplary spoken help information 226: "Command 1 invokes the shopping cart. Press this button to view your purchases." Accordingly, the audio information is specifically targeted to the particular part of the application interface 204 that the user 102 happens to be interacting with at the time.

The help functionality 128 can supply this audio information in different ways. This audio information can originate from the local storage media 126, the remote database 152, or from both local and remote sources. The audio information can be pre-recorded human voice, pre-recorded synthesized voice, audio information that is generated in real-time fashion based on stored text information, or based on some other technique. In any event, the audio information can be stored in segments that represent different parts of words, phrases and/or sentences, and so on. The help functionality 128 can assemble these parts to form meaningful content for delivery to the user 102 depending on the context of the user 102's interaction with the application interface 204. In one case, the different possible permutations of assembled help instructions define a limited set of instructions that can be presented to the user 102. In another case, the help functionality 128 can be configured to compose the instructions in an open-ended and dynamic fashion based on the context of the user 102's current interaction with the application interface 204; in this case, the number of permutations of help instructions created by the help functionality 128 may be unlimited, or, in any event, very large. Again, artificial intelligence functionality, constraint processing functionality, and so on can be used to intelligently compose appropriate instructions depending on the user 102's context-specific interaction with the application interface 204.

The audio help information can be supplied to the audio output device 134 (e.g., speaker(s)) in any fashion. For instance, in the remote mode, the audio help information can be transferred to the audio output device 134 using any protocol, such as Real Time Protocol (RTP), Real Time Control Protocol (RTCP), Real Time Streaming Protocol (RTSP), or any other format. Instead of a streaming protocol, the remote help functionality 128 can transfer the audio information in bulk fashion, e.g., as a complete file, upon which the user device 104 subsequently presents it to the user 102. In yet another case, the remote help functionality 128 can transfer only instructions to the user device 104 (such as index information), whereupon the user device 104 uses these instructions to pull audio information from its own local storage media 126 and present it to the user 102. Still other techniques can be employed to accomplish the presentation of audio information.

According to another implementation, the human assistant 158 can provide real-time spoken instructions to the user 102 over the coupling mechanism 162 or over some other voice communication channel. These spoken instructions can be based on the assistant 158's experience in the type of problem that the user 102 may be experiencing. As mentioned above, the user device 104 can also include a mechanism for receiving the user 102's own voice and forwarding it to the assistance center 106. This allows the user 102 to reply to the assistant 158. The automated assistance module 154 can also include voice recognition technology for automatically analyzing the user 102's questions and answers. Through this mechanism, the system 100 can accommodate a dialog between the user 102 and the assistant 158.

The audio mode allows the help functionality 128 to deliver help information in a non-obtrusive manner. That is, audio information inherently does not clutter the application interface 204 with potentially distracting information. The help functionality 128 can rely on the user 102's positioning of a pointer 220 to determine what help information should be presented to the user 102, but this pointer 220 represents a relatively small amount of overhead information, and thus should not unduly clutter the application interface 204. Furthermore, the help functionality 128 can present this pointer 220 on the see-through panel 202, thus further reducing any distraction caused by the pointer 220. This mechanism contributes to a better user experience, as the help information is essentially non-obtrusively layered "on top" of the application interface 204, supplementing the application interface 204 in an effective way, but not otherwise interfering with its normal look and feel.

Alternatively, or in addition, the help functionality 128 can present visual help information. FIG. 2 shows that visual help information 228 is presented on the see-through panel 202 itself. This gives the impression that this help information 228 is separate from the display features of the application interface 204. This, in turn, potentially reduces the confusion of the user 102, as the user 102 can more easily discriminate between what information is being presented by the primary application and what information is being presented by the help functionality 128. FIG. 2 shows that the visual help information 228 is presented such that it does not overlap any of the features on the application interface 204. However, in other cases, the help functionality 128 can present the visual help information 228 such that it overlaps part of the features of the application interface 204. The visual help information can also have see-through properties. All of these display properties allow a great amount of information to be presented in a small space without unduly confusing the user 102, and is thus ideal for small computing devices with small display surfaces.

The visual help information can take other forms besides the textual form shown in FIG. 2. For instance, the help functionality 128 can present symbolic information, pictorial information, animated demonstrations, and so on. Also, the help functionality 128 can present the visual help information directly on the application interface 204 itself. In any case, the help functionality 128 can automatically remove the help information 228 after a predetermined amount of time or in response to the express request of the user 102 (such as in response to the user 102 clicking on the help information 228 or taking some other input action which targets the help information 228).

Figure 3:
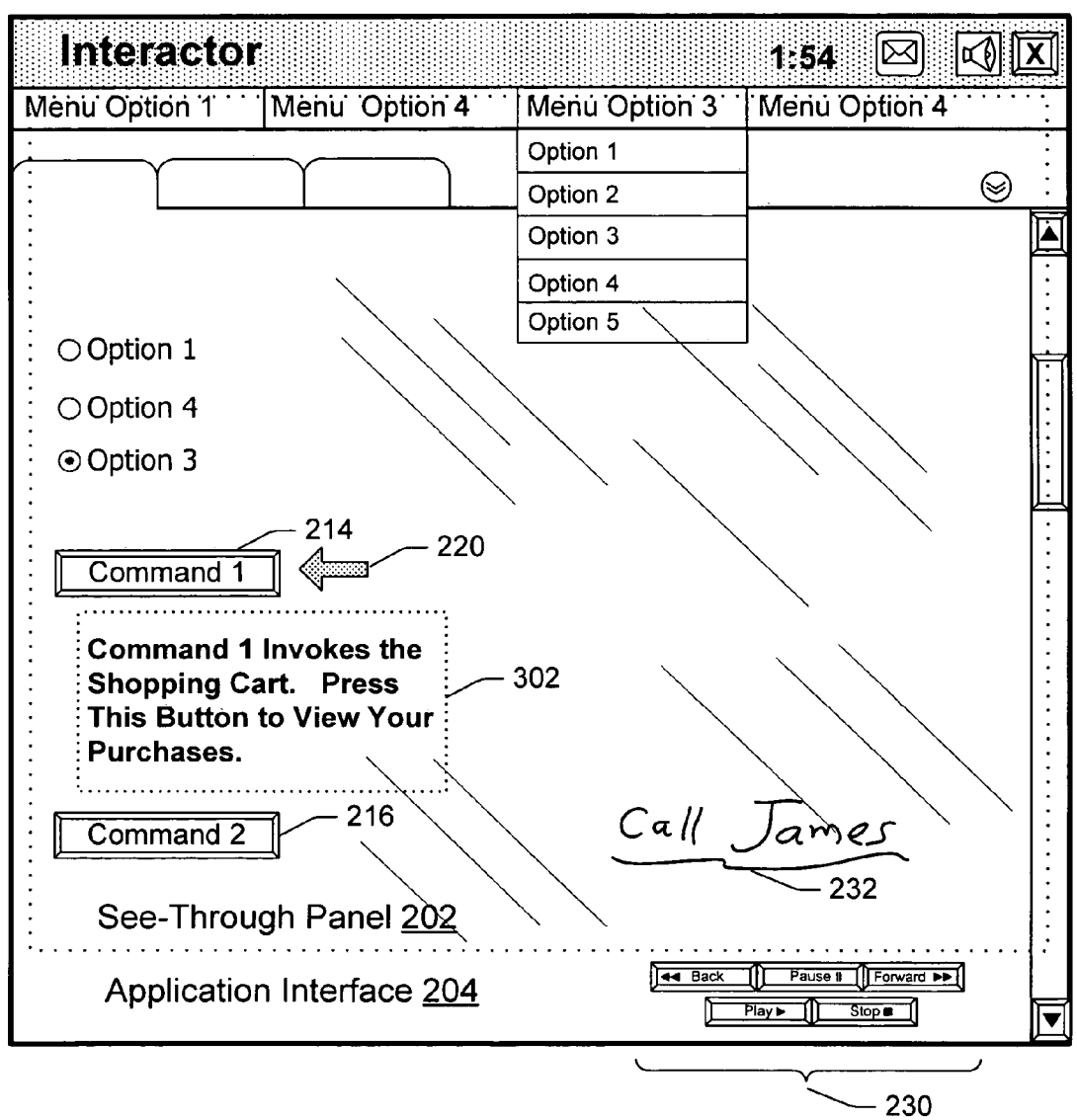
FIG. 3 shows another exemplary user interface presentation for providing help information to the user using the system of FIG. 1.

Other techniques can be used to present visual help information in a non-obtrusive way. FIG. 3 shows one such alternative technique. As indicated here, the user 102 has again positioned the pointer 220 such that it points to command button 214. In this case, however, the help functionality 128 presents visual help information 302 by actually moving user interface features apart on the application interface 204. In this case, the help functionality 128 moves apart command button 214 and command button 216, and then inserts the visual help information 302 in between command button 214 and command button 216. Upon removal of the help information 302, the help functionality 128 can move command button 214 and command button 216 back together again. As explained above, the help functionality 128 can automatically remove the help information 302 after a predetermined of time or in response to the express request of the user 102 (such as in response to the user 102 clicking on the help information 302 or taking some other input action which targets the help information 302). In the FIG. 3 implementation, the help functionality 128 presents the visual help information 302 on the see-through panel 202. But the help functionality 128 can alternatively present the visual help information 302 on the application interface itself 204, thus potentially eliminating the use of the see-through panel 202.

FIG. 3 thereby presents a dynamic manner of presenting help information in which portions of the application interface 204 are moved to accommodate the presentation of help information. This promotes user comprehension of the user interface presentation 142, as it intelligently positions the help information on the user interface presentation 142 to promote conceptual association of the help information with the corresponding interface feature which its explains. It also is ideal for computer devices with small displays, as the contents of the user interface presentation 142 can be dynamically arranged to accommodate the temporary display of help information.

Generally, like the case of the audio help information, the help functionality 128 can supply the visual help information in different ways. This information can originate from the local storage media 126, the remote database 152, or from both local and remote sources. The visual help information can be stored in segments that represent different parts of words, phrases and/or sentences, and so on. The help functionality 128 can assemble these parts to form meaningful content for delivery to the user 102 depending on the context of the user 102's interaction with the application interface 204. In this manner, the help functionality 128 can form a limited group of possible visual help instructions, or, in a dynamic and open-ended fashion, a potentially unlimited number of such instructions. The visual help information can be supplied to the user interface presentation 142 in any fashion based on any protocol, such as Synchronized Multimedia Integration Language (SMIL), and so on.

In another implementation, the human assistant 158 can manually enter (e.g., type) visual help information for presentation to the user 102 on the display device 140 of the user device 104.

In any of the above cases, playback-type controls 230 can be used to govern the playback of help information (either audio or visual information, or both). For instance, suppose that the user 102 has identified command button 214 as a feature concerning which he or she would like more information. This can prompt the help functionality 128 to present an audio segment or animated visual demonstration that explains the command button 214. The playback controls allow the user 102 to control the playback of this help information, e.g., by playing back a portion of the information, pausing the information, fast forwarding the information to a different part of the information, and so on.

Finally, the see-through panel 202 can also serve a number of functions not directly related to the help functionality 128. For instance, with reference to either FIG. 2 or FIG. 3, the user device 104 can be configured in such a manner to allow the user 102 to add handwritten notes on the see-through panel 202, such as the exemplary note 232, "Call James," created using a stylus. The user device 104 can include provisions which allow the user 102 to save such notes and retrieve them at a later time.

The above-identified audio and visual presentation features are useful in the context of any user device, but are particularly valuable with smaller user devices (mobile cell telephones, PDAs, tablet-type input devices, etc.). This is because these smaller devices have correspondingly smaller display surfaces. In these devices, there are often severe restrictions on the complexity of the user interface. The above-described delivery of audio and visual information does not unduly complicate (e.g., clutter) a display surface, and is therefore ideal for these smaller user devices.

A.2.iii. Specific Exemplary Implementations of the Help Functionality

Figure 4:
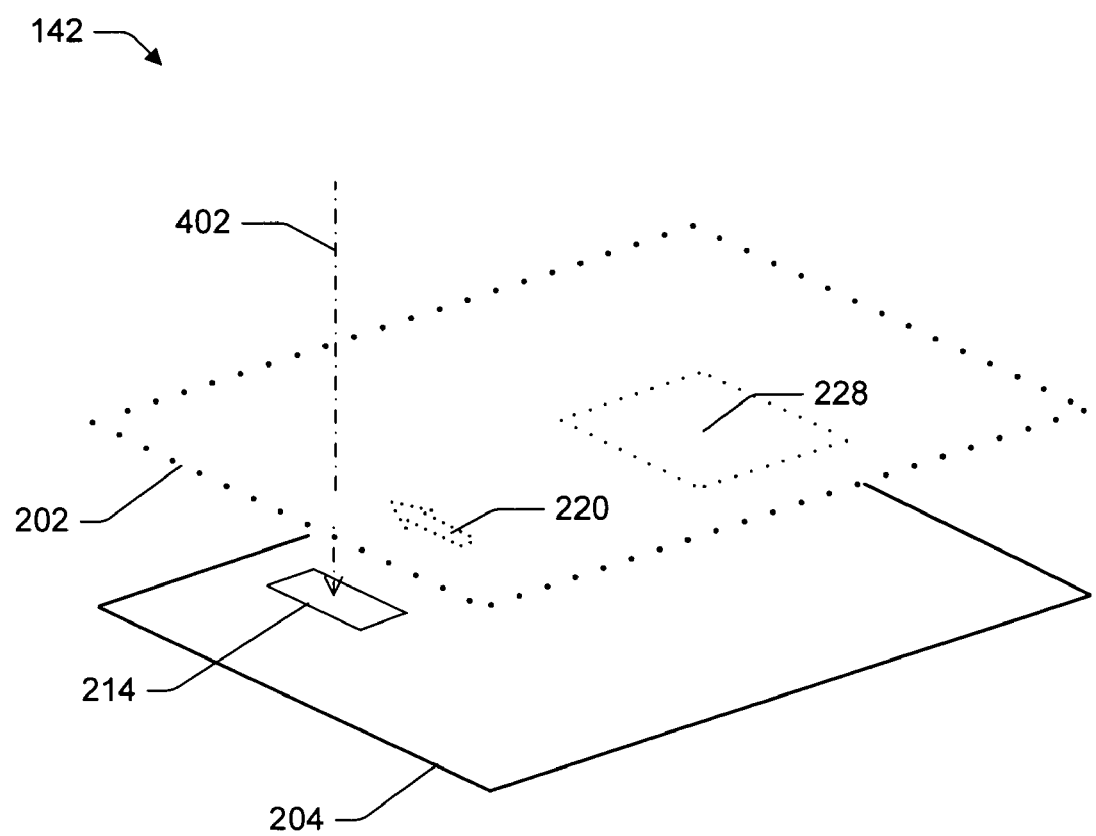
FIG. 4 demonstrates the exemplary structure of the user interface presentation of FIG. 2.

FIG. 4 shows the structure of part of the user interface presentation 142 of FIG. 2. The user interface presentation 142 includes the see-through panel 202 positioned over the application interface 204. FIG. 4 emphasizes the distinction between these two visual components (202, 204) by showing the see-through panel 202 literally positioned above the application interface 204 (for the purpose of explanation). The application interface 204 can include several user interface features, one of which is the command button 214. The see-through panel 202 includes the pointer 220 (or other mark) and the visual help information 228 which explains the command button 214.

As described above, the user 102 can position the pointer 220 anywhere over the application interface 204 to point to different features on the application interface 204 and then receive the help information 228 which corresponds to the features. In the example of FIG. 4, the user 102 has positioned the pointer 220 so that it points to the command button 214. In response, the help functionality 128 presents the visual help information 228 which explains some aspect of the command button 214.

At the same time, the user device 104 permits the user 102 to interact with the application interface 204. In interacting with the application interface 204, the user 102 thereby "penetrates" through the see-through panel 202 to interact with its features, such as by activating command buttons and options, entering information into text entry fields, and so on. In the case of FIG. 4, as indicated by line 402, the user 102 is permitted to penetrate through the see-through panel 202 and activate command button 214.

The above functions can be implemented in different ways. In one technique, the visual illusion of a see-through panel can be implemented using various application programming interfaces (APIs) (such as the Win32® suite of APIs provided by Microsoft Corporation). In this technique, the APIs can be used to construct pixel information defining the user interface presentation 142 using a temporary "scratch" storage area (not shown), and then transfer the pixel information to a periodically refreshed frame buffer (not shown) provided by the display logic 138. The user device 104 can then display the user interface presentation 142 on the display device 140 based on the pixel information stored in the frame buffer. The user device 104 can construct the interface presentation 142 in the above-described manner by successively applying different "layers" of the user interface fields in the scratch storage area, such as by first creating a base layer containing various features of the application interface 204, and then adding various features of the see-through panel 202. Adding a second layer onto the first layer can have the effect of overwriting a collection of pixels in the first layer. For example, to simulate the effects of the see through-panel 202, the user device 104 can overwrite pixels in the original application interface 204 with a collection of pixels defining simulated glass streaks in the see-through panel 202. When the desired see-through effect has been achieved, the user device 104 can transfer the pixel information defining the resultant composite user interface presentation 142 from the scratch storage area to the frame buffer using any kind of mechanism, such as a bit block transfer (blit) technique. In a bit block transfer technique, a rectangular group of pixels is transferred to display memory. In an alternative technique, the computer device 104 can create the desired see-through effect by directly operating on the frame buffer.

In any of the above techniques, alpha-blending can be used to create the see-through effect. Alpha blending works by blending source image information with destination image information to create final image information in the following manner: final image information=(source image information)*(source alpha factor)+(destination image information)*(destination alpha factor). The alpha factors typically vary from 0 to 1 and define the extent to which the source image information and the destination image information blend together to create the illusion of one layer of information having some degree of transparency being superimposed on another layer. Such blending operations can be performed on a global scale to inclusively define the entire user interface presentation 142 provided by the user device 104, or can be applied in cooperation with other user interface functionality (such as the Windows™ operating system) to only govern certain aspects of the user interface presentations provided by such other user interface functionality.

One exemplary tool for performing the above-described blending operation is provided by the DirectX® line of software products provided by Microsoft Corporation. General background information on alpha blending using this product can be found in a number of sources, such as Peter Walsh, Advanced 3-D Game Programming Using DirectX® 8.0, Wordware Publishing, Inc., Plano, Tex., 2002, pp. 441-445.

Still further strategies exist for implementing the see-through panel shown in FIG. 4. For instance, the user device 104 can actually provide two physical display surfaces that are sandwiched together, a first surface for presenting help information and a second surface for presenting application interface information.

Whatever technique is used to create the see-through effect, the user interface features that populate the see-through panel 202 (such as the pointer 220) can be created in different ways. In one technique, the user device 104 can provide these user interface features by using a pre-existing library of user interface resources that are also available to the underlying application interface 204. In another technique, the user device 104 can provide these user interface features by dynamically modifying one or more of such pre-existing user interface resources. In still another technique, the user device 104 can provide these user interface features by dynamically creating new user interface features that do not have direct counterparts in the pre-existing user interface resources. Or the user device 104 can apply any combination of the above-described techniques.

Likewise, the dynamic shifting of user interface features shown in FIG. 3 can be implemented in different ways. According to one mechanism, the help functionality 128 can include geometry processing functionality (GPF) 164 which manages the display of user interface features on the user interface presentation 142. When the help functionality 128 seeks to display help information, the GPF 164 can determine where to insert the help information among a collection of currently displayed user interface features, and, if necessary, how to move these currently displayed user interface features to accommodate the display of the help information.

The GPF 164 can perform the above-described tasks in different ways. In one technique, each user interface feature in the user interface presentation 142 can have metadata associated therewith which is stored in memory. Among other information, the metadata can include information which determines the level of importance associated with the user interface feature. For instance, the help functionality 128 might assign a relatively high level of importance to one of more controls, such as command button 214; assume, for instance, that command button 214 is deemed important because the user 102 cannot interact with the primary application without this button 214. On the other hand, the primary application might provide other user interface features that do not serve such a critical role. For example, with reference to FIG. 2, the primary application might supply the text entry box 218 which enables the user 102 to enter optional comments; as such, the user 102's interaction with the primary application will not be disabled if this text entry box 218 is momentarily removed. The help functionality 128 can accordingly assign a lower level of importance to the text entry box 218 relative to the command button 214. Within this priority ranking scheme, the help functionality 128 can also assign importance levels to the help information itself. In general, the user interface features and help information have display fields associated therewith which define the display "real estate" required to present these features and information.

When prompted to display help information, the GPF 164 can determine what display fields should be shifted (if necessary) based on the above-described priority levels assigned to the user interface features that are currently being displayed vis-à-vis the priority level assigned to the help information itself. For example, in one exemplary case, the GPF 164 can assign a relatively high priority ranking to all help information. In this case, the GPF 164 can respond to a request to display this help information by determining the user interface features having the lowest priority that are currently being displayed on the user interface presentation 142. The GPF 164 can then momentarily move the display fields associated with these features to accommodate the display of the help information, and can even potentially momentarily remove one or more of such display fields from the user interface presentation 142. For instance, in FIG. 3, the GPF 164 displays the help information 302 by moving command button 214 momentarily apart from command button 216, and by inserting the help information 302 in the space between these buttons (214, 216). This may cause other display fields in the user interface presentation 142 to be shifted as well, and, in this example, may also cause the text entry box 218 (shown in FIG. 2) to be entirely momentarily removed from the user interface presentation 142 (the result of which is demonstrated in FIG. 3). This movement may reflect, among other factors, that the text entry box 218 has a low importance level associated therewith and can be feasibly removed without disabling the user 102's interaction with the primary application. The GPF 164 can be configured to restore the user interface presentation 142 to its original state after a predetermined period of time (such as several seconds or minutes), or in response to the express command of the user 102. This involves removing the help information and shifting the display fields back to their original positions. On the other hand, if the help information has a relatively low level of importance relative to the currently displayed user interface features, then the GPF 164 might entirely proscribe its presentation.

The GPF 164 can implement the above-described shifting of display fields in any manner, such as by adding display position offsets to the pixel coordinates associated with the fields to be shifted, and then redrawing the user interface presentation 142 using these offset display coordinates. The GPF 164 can then restore the user interface presentation 142 to its initial state by restoring the display fields to their original display coordinates and then again redrawing the user interface presentation 142.

The GPF 164 can apply different kinds of UI space-management paradigms to determine how to shift display fields. In one basic illustrative and exemplary case, the GPF 164 can: a) determine where to insert the help information; b) determine the "height" H of the rectangle needed to display the help information (e.g., as defined by the vertical span of help information field 302 shown in FIG. 3); c) shift all of the display fields above the insert position up by ½ H and shift all of the display fields below the insert position down by ½ H; and d) display the help information 302 in the space created thereby. Still more complex algorithms can be used. For example, the GPF 164 can be configured to shift fields in the horizontal display direction as well as the vertical direction.

The GPF 164 can also be configured to apply various heuristic rules to govern the display of help information. For example, the priority level assigned to a user interface feature need not be static. A collection of rules may determine the priority level assigned to user interface features in different contexts; for example, if the user 102 is inquiring about a specific user interface feature, then the priority of this feature should be elevated accordingly so that it is not removed from the user interface presentation 142. Another collection of rules may govern where the help information is displayed relative to the user interface feature that the user 102 is inquiring about; for instance, it is desirable to display the help information as close to the target feature as possible to promote comprehension of the resultant user interface presentation 142. Another collection of rules may govern how to move other user interface fields (that are not being inquired about) to accommodate the display of the help information; for instance, some user interface features may be linked to a group of other user interface features, such that it is desirable to move the group en bloc if one of its members is moved, and so on. Still further rules can be defined depending on the design of the underlying application interface 204 and other environmental and design-related factors.

Further, the GPF 164 can be configured to apply various optimization algorithms to determine where to insert help information and how to move existing display fields to accommodate the display of such help information. That is, such algorithms can apply any kind of operations research strategies to provide an optimal "packing" of rectangular display fields associated with the user interface features and help information to be presented. Further, the GPF 164 can be configured to apply any kind of artificial intelligence (e.g., expert system) analysis or constraint processing analysis to determine how to reconfigure the user interface presentation 142 to accommodate the display of help information.

In any of the above cases, the GPF 164 can further improve its performance by requiring that additional fields of metadata be associated with the user interface features. For instance, in addition to priority information, the help functionality 128 can create metadata that determines how a user interface feature should be moved in different display contexts. For example, this metadata can define how the user interface feature should be moved (or not moved) relative to other user interface features (providing that all of these features are being displayed at the same time). The GPF 164 can be configured to read such supplemental metadata and use it in its determination of how to modify the user interface presentation 142 to accommodate the display of the help information. Further, the help functionality 128 need not assign the same level of importance to all help information. Some help information can be assessed as more important than other help information.

The above-described geometry processing paradigms are exemplary and non-limiting; other techniques and mechanisms can be used depending on the technical environment in which the help functionality 128 is employed. Further, although the GPF 164 is shown in FIG. 1 as being implemented as a module of the help functionality 128, the user device 104 can provide the GPF 164 as an independent functional module which is accessible to the help functionality 128. Further, although the GPF 164 is shown as being implemented by the user device 104, it can also be implemented, in whole or in part, by a remote processing resource (e.g., the assistance center 106).

Figure 5:
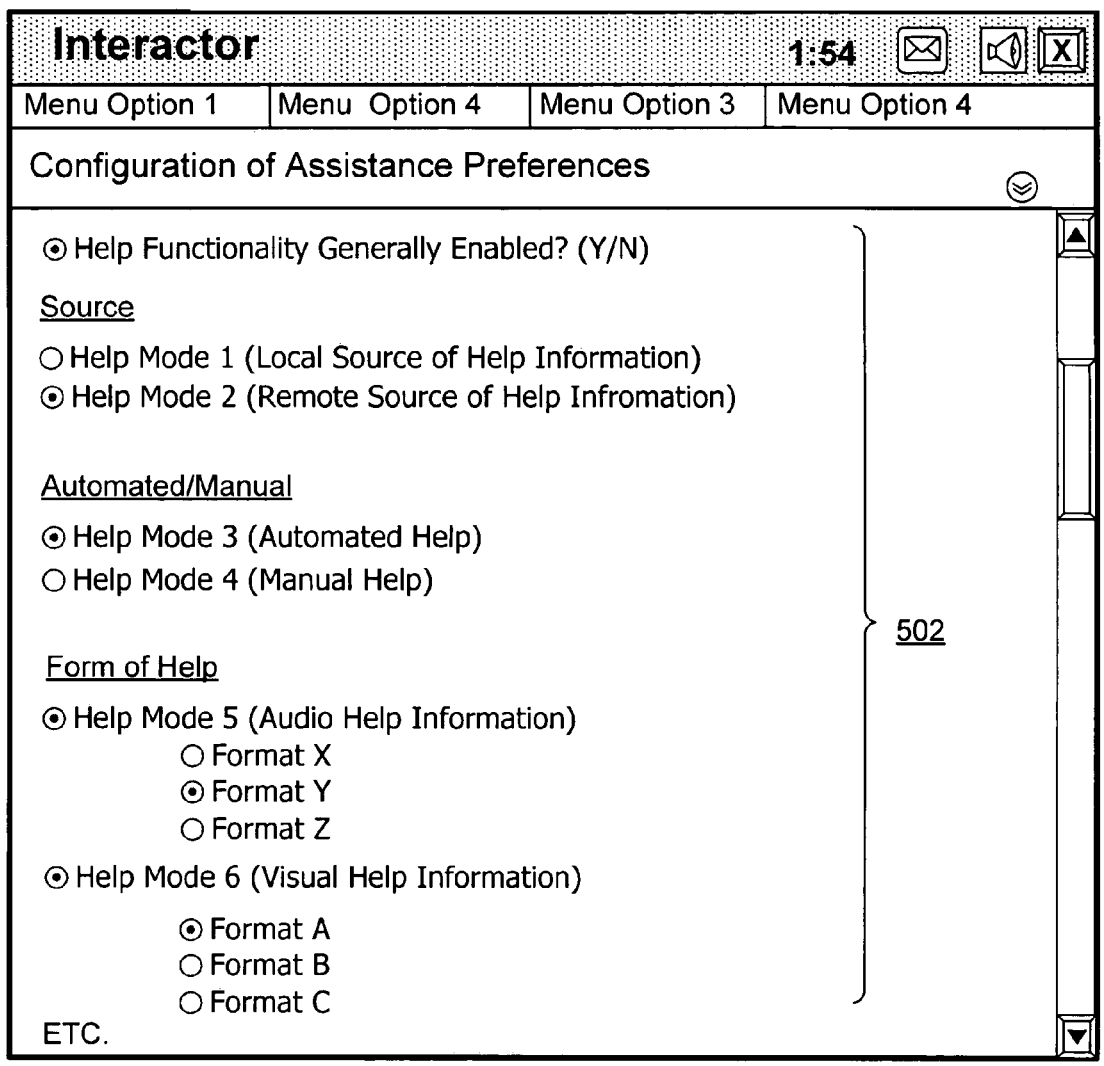
FIG. 5 shows an exemplary user interface presentation that allows the user to select one of multiple help presentation modes that can be provided by the system of FIG. 1.

Now turning to FIG. 5, this figure shows a user interface 500 that allows the user 102 to select one or more help modes 502. That is, as noted above, the help functionality 128 can supply help information in different ways. According to one option, the invoked help functionality 128 can be housed at the local site, the remote site, or a combination of the local site and the remote site. According to another option, the help functionality 128 can deliver help information in a fully automated manner, a fully manual manner (e.g., by using the services of the human assistant 158), or a combination of automated manner and manual manner. According to another option, the help information itself can be audio information, visual information, or some combination of audio information and visual information. Yet further options are possible. Different help modes can be defined that corresponds to different respective combinations of the above-specified options. The user interface 500 allows the user 102 to select one or more help modes that will govern the user 102's interaction with the primary application.

For example, in the illustrative case of FIG. 5, the user 102 has specified that the help information will originate from the remote assistance center 106 (e.g., from the database 152). The user 102 has also specified that the help functionality 128 should deliver the help information in automated fashion without the services of the human assistant 158. The user 102 has also specified that the help information should be presented in both audio and visual formats. Further, the user interface 500 allows the user 102 to further refine his or her help information presentation preferences by specifying how the audio and/or visual help information is to be presented. For example, for audio presentation, the user interface 500 may allow the user 102 to select among different audio delivery types, such as streaming type mode, bulk delivery type mode, and so on. For visual presentation, the user interface 500 may allow the user 102 to select among different visual delivery types, such as the presentation of help information on the see-through panel 202, the presentation of help information by dynamically moving parts of the application interface 204, and so on.

Alternatively, depending on the environment, the system 100 can be "hardwired" so that it provides only one or more of the help mode options (that is, by not allowing the user 102 to select among several help options).

Finally, the remote assistance module 156 used by the human assistant 158 can be implemented in different ways. For instance, the remote assistant module 156 can monitor the user interface presentation 142 that is being presented on the display device 140 of the user device 104 using Microsoft Corporation's Remote Desktop functionality, or a modification thereof.

B. Exemplary Method of Operation

Figure 6:
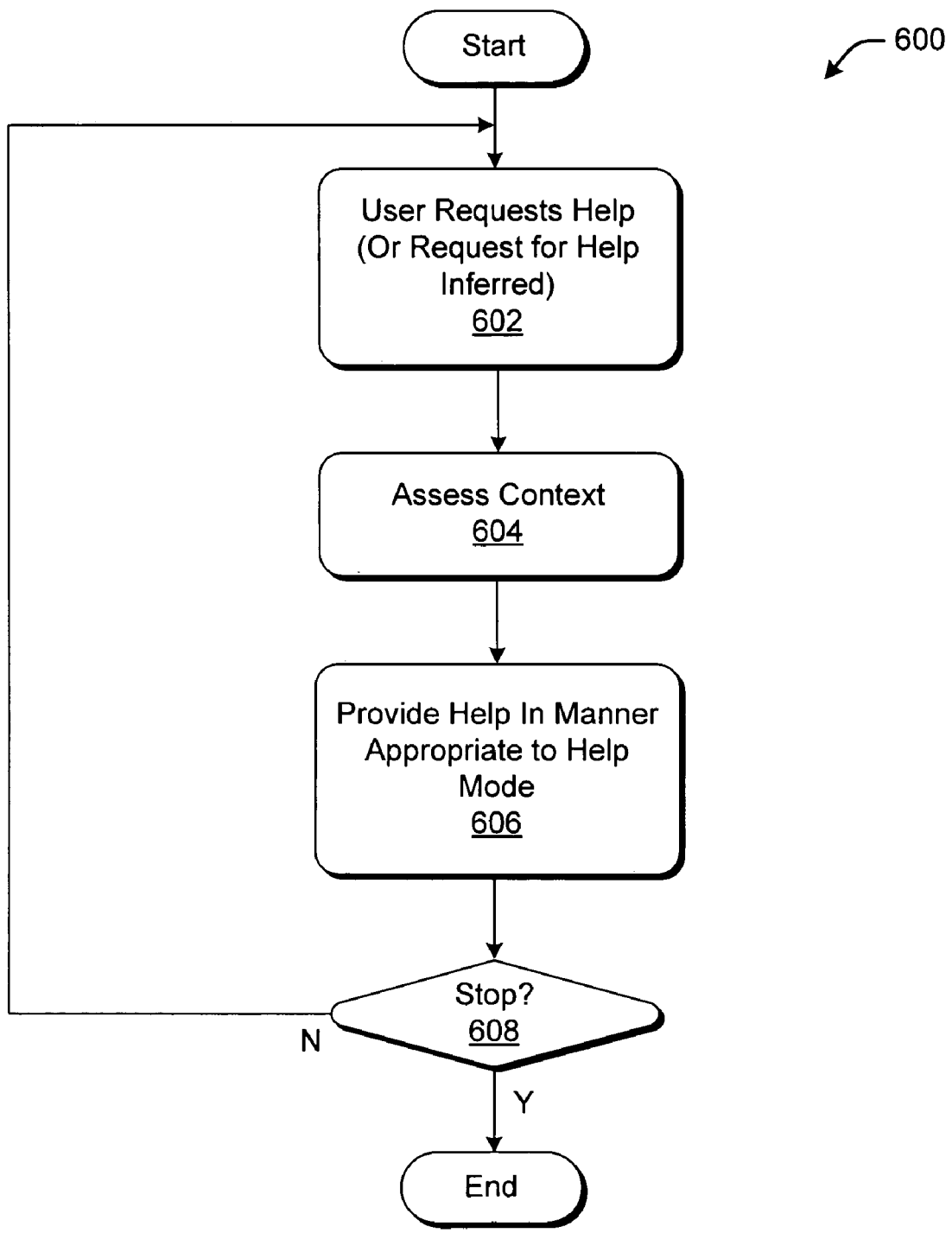
FIG. 6 shows an exemplary procedure that explains the operation of the system of FIG. 1.

FIG. 6 summarizes some of the functionality described in Section A in flow chart form. In general, to facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

In step 602, the user 102, who is interacting with the primary application, requests help information. The user 102 can perform this function by positioning the pointer 220 in proximity to a particular feature of the application interface 204. Or the user 102 can mark the feature with a stylus, and so on. Alternatively, or in addition, the help functionality 128 can automatically infer that the user 102 requires help, e.g., based on analysis of the pattern of the user 102's prior input actions.

In step 604, the help functionality 128 assesses the help presentation context. That is, in this step 604, the help functionality 128 determines what help information should be presented to the user 102. The help functionality 128 can perform this task by mapping information regarding the position of the pointer 220 vis-a-vis the underlying features of the application interface 204. The help functionality 128 can alternatively, or in addition, perform this function by making a contextual analysis of the user 102's prior input actions (to determine the appropriate help information to present based on a determination of what the user 102 is trying to do).

In step 606, the help functionality 128 delivers the help information to the user 102 according to the help mode that has been selected by the user 102 (or that has been fixed by the system 100). Possible help modes were identified with respect to FIG. 5.

As indicated by decision diamond 608, the above procedure can be repeated a plurality of times as the user 102 navigates through the primary application.

Figure 7:
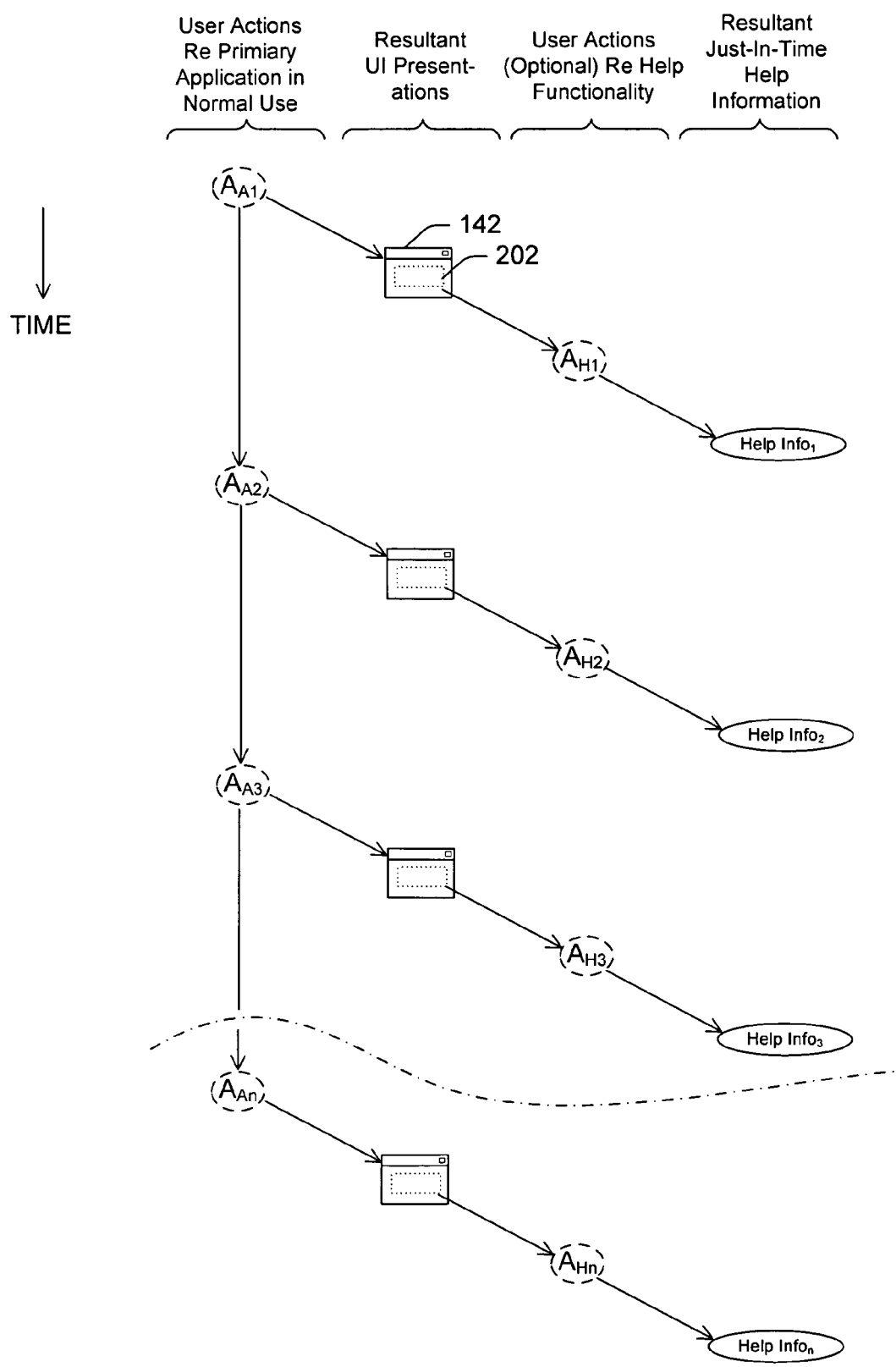
FIG. 7 shows an exemplary sequence of actions and corresponding user interface presentations that explain the operation of the system of FIG. 1.

Finally, FIG. 7 describes the just-in-time delivery of help information which is the outcome of the procedure shown in FIG. 6. The first column of this figure shows a series of actions ($A_{A1}, A_{A2}, \ldots A_{An}$) that the user 102 can make with respect to the application interface 204 (not shown in FIG. 7) provided by the primary application. In other words, the first column reflects the user 102's normal interaction with the primary application to perform a desired application task (such as ordering an item via an online shopping service). The second column of this figure shows a series of user interface presentations 142 that are presented in response to the actions shown in the first column. The user interface presentations 142 include help-related interface features that are associated with the underlying application interface 204. For instance, the user interface presentations 142 can include the see-though panel 202; this panel 202 allows the user 102 to invoke the help functionality 128. The third column of the this figure shows a series of actions ($A_{H1}, A_{H2}, \ldots A_{Hn}$) that the user 102 can make with respect to help-related interface features enabled by the user interface presentations 142 shown in the second column. For instance, these actions ($A_{H1}, A_{H2}, \ldots A_{Hn}$) may represent the user 102 moving the pointer 220 (not shown in FIG. 7) to point to different features underling the see-through panel 202. These actions are optional in the sense that, in an alternative implementation, the help functionality 128 can automatically infer the topics regarding which the user 102 requires assistance based on context-analysis, or the human assistant 158 can manually determine the topics regarding which the user 102 requires assistance. The fourth column shows a series of help information presentations that are provided as a result of the events in the third column. For instance, this help information may represent a series of visual help information messages 228 (not shown in FIG. 7) presented on the see-through panel 202.

As illustrated in FIG. 7, the help functionality 128 works seamlessly with the underlying primary application. This seamless integration ensues from at least two features. First, the help functionality 128 provides help information to the user 102 that is automatically and appropriately targeted to the task that the user 102 is engaged in, and this information is presented just when the user 102 needs this information. Second, the help functionality 128 presents the help information in a manner that does not unnecessarily interfere with the operation of the primary application. In this sense, the help functionality 128 "rides on top" of the primary application, offering only relevant information to the user 102, just when the user 102 needs it.

In closing, a number of examples were presented in this disclosure in the alternative (e.g., case X or case Y). In addition, this disclosure encompasses those cases which combine alternatives in a single implementation (e.g., case X and case Y), even though this disclosure may have not expressly mentioned these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for presenting help information to a user, comprising:

providing an application interface generated by a primary application, wherein the application interface includes at least one user interface feature associated therewith;

providing a help selection mechanism comprising a see-through panel which substantially overlays the one user interface feature associated with the application interface and allowing the user to request help information regarding the underlying one user interface feature;

receiving a help request regarding the underlying one user interface feature from the user through the help selection mechanism while the one user interface feature is substantially overlaid by the see-through panel, the request being submitted by the user after the underlying one user interface feature is identified on the see-through panel; and presenting, in response to the received help request, the visual help information to the user on the see-through panel provided by the help selection mechanism, wherein the user is allowed to interact with the underlying one user interface feature associated with the primary application while the one user interface feature remains substantially overlaid by the see-through panel during the interaction.

2. The method according to claim 1, wherein the method is performed using at least one of: a mobile telephone device; a personal digital assistant device; a laptop computer device; a tablet-type input device; or a wearable computer device.

3. The method according to claim 1, wherein the method is performed using a computer workstation.

4. The method according to claim 1, wherein the receiving of the help request from the user comprises receiving information indicating that the user has positioned a marker on the help selection mechanism in proximity to said one user interface feature.

5. The method according to claim 1, where the receiving of the help request from the user comprises receiving information indicating that the user has created a mark on the help selection mechanism in proximity to said one user interface feature using a marking mechanism.

6. The method according to claim 1, further comprising, in response to the receipt of the user's help request, determining what help information to present to the user.

7. The method according to claim 6, wherein the determining of what help information to present to the user comprises automatically mapping the help request received from the user to the associated help information.

8. The method according to claim 6, wherein the determining of what help information to present to the user comprises manually determining, by a human assistant, the help information to deliver to the user based on the user's help request.

9. The method according to claim 1, wherein the presenting of the help information to the user comprises presenting audio help information to the user.

10. The method according to claim 1, wherein the presenting of the help information to the user comprises presenting help information based on a context of the user's interaction with the application interface as determined by a series of the user's prior actions in interacting with the application interface.

11. The method according to claim 1, wherein the presenting of the help information to the user comprises delivering the help information from a source which is local with respect to a computer device on which the user performs the method.

12. The method according to claim 1, wherein the presenting of the help information to the user comprises delivering the help information from a source which is remote with respect to a computer device on which the user performs the method.

13. A computer readable medium including machine readable instructions for implementing each of the providing the application interface, providing the help selection mechanism, receiving the help request, and presenting the help information of claim 1.

14. An apparatus for presenting help information to a user, comprising:
a display device;
logic configured to provide an application interface, generated by a primary application, on the display device, wherein the application interface includes at least one user interface feature associated therewith;
logic configured to provide a help selection mechanism that overlays the application interface, which allows the user to request help information regarding said one user interface feature, the help selection mechanism comprising a see-though panel which substantially overlays said one user interface feature associated with the application interface;
logic configured to receive a help request regarding the underlying one user interface feature from the user through the help selection mechanism while the one user interface feature is substantially overlaid by the see-through panel, the request being submitted by the user after the underlying one user interface feature is identified on the see-though panel provided by the help selection mechanism; and
logic configured to present, in response to the received help request, the visual help information to the user on the see-through panel provided by the help selection mechanism wherein the user is allowed to interact with the underlying one user interface feature associated with the primary application while the one user interface feature remains substantially overlaid by the see-though panel during the interaction.

15. The apparatus according to claim 14, wherein the apparatus is one of: a mobile telephone device; a personal digital assistant device; a laptop computer device; a tablet-type input device; or a wearable computer device.

16. The apparatus according to claim 14, wherein the apparatus is a computer workstation.

17. The apparatus according to claim 14, wherein the help selection mechanism is configured to provide a movable marker thereon, and wherein the logic for receiving the help request is configured to receive information indicating that the user has positioned the marker in proximity to said one user interface feature.

18. The apparatus according to claim 14, wherein the help selection mechanism is configured to receive marks made by a marking mechanism, and wherein the logic for receiving the help request is configured to receive information indicating that the user has created a mark on the help selection mechanism in proximity to said one user interface feature using the marking mechanism.

19. The apparatus according to claim 14, wherein the logic for presenting the help information to the user is configured to present audio help information to the user.

20. The apparatus according to claim 14, wherein the logic for presenting the visual help information to the user is configured to present help information based on a context of the user's interaction with the application interface as determined by a series of the user's prior actions in interacting with the application interface.

21. The apparatus according to claim 14, wherein the logic for presenting the help information to the user is configured to receive delivered help information from a source which is local with respect to the apparatus.

22. The apparatus according to claim 14, wherein the logic for presenting the help information to the user is configured to receive delivered help information from a source which is remote with respect to the apparatus.

23. A computer readable medium including machine readable instructions for implementing each of the logic recited in claim 14.

24. A system for presenting help information to a user, comprising:
an assistance center configured to supply help information to the user;
a coupling mechanism;
at least one apparatus coupled to the assistance center via the coupling mechanism;
wherein said at least one apparatus comprises:
a display device;
logic configured to provide an application interface, generated by a primary application, on the display device, wherein the application interface includes at least one user interface feature associated therewith;
logic configured to provide a help selection mechanism that overlays the application interface, which allows the user to request help information regarding said one user interface feature, the help selection mechanism comprising a see-through panel which substantially overlays said one user interface feature associated with the application interface;
logic configured to receive a help request regarding the underlying one user interface feature from the user through the help selection mechanism while the one user interface feature is substantially overlaid by the see-through panel, the request being submitted by the user after the underlying one user interface feature is identified on the see-through panel provided by the help selection mechanism; and
logic configured to receive the help information from the assistance center in response to the received help request;
logic configured to present, in response to the received help request, the received help information to the user on the see-through panel provided by the help selection mechanism, wherein the user is allowed interact with the underlying one user interface feature associated with the primary application while the one user interface feature remains substantially overlaid by the see-through panel during the interaction.

* * * * *